(12) United States Patent
Kobayashi (10) Patent No.: US 8,074,618 B2
(45) Date of Patent: Dec. 13, 2011

(54) GAS-ENGINE-MOUNTED WORKING MACHINE

(75) Inventor: Hideaki Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 590 days.

(21) Appl. No.: 12/274,950

(22) Filed: Nov. 20, 2008

(65) Prior Publication Data

US 2009/0126680 A1    May 21, 2009

(30) Foreign Application Priority Data

Nov. 21, 2007  (JP) .................................. 2007-302146

(51) Int. Cl.
*F02B 63/00* (2006.01)
*F02B 67/00* (2006.01)
*F02B 77/08* (2006.01)
(52) U.S. Cl. .................... 123/195 A; 123/2; 123/198 D; 180/69.5

(58) Field of Classification Search .................. 123/1 R, 123/2, 195 R, 195 A, 198 D; 180/69.5; 280/834
See application file for complete search history.

(56) References Cited

FOREIGN PATENT DOCUMENTS
JP    11-170876 A    6/1999

*Primary Examiner* — Noah Kamen
(74) *Attorney, Agent, or Firm* — Arent Fox LLP (57) ABSTRACT

In a gas-engine-mounted working machine, a gas engine is mounted on a machine body and supplied with fuel gas from a cassette gas canister, a handle column extends rearwardly and upwardly from the machine body, and the cassette gas canister is detachably attached to the handle column. Operating handle is collapsably attached to the handle column. Collapsing-movement-preventing member is provided on the operating handle for preventing collapsing movement of the operating handle, utilizing presence of the cassette gas canister attached to the handle column, so that the collapsing movement of the operating handle is prevented as long as the cassette gas canister is attached to the handle column.

5 Claims, 9 Drawing Sheets

GAS-ENGINE-MOUNTED WORKING MACHINE

FIELD OF THE INVENTION

The present invention relates to gas-engine-mounted working machines including a handle column extending rearwardly and upwardly from the machine body and an operating handle collapsably attached to the handle column.

BACKGROUND OF THE INVENTION

Among the conventionally-known working machines are ones which include a gas engine mounted on the machine body, a handle base (hereinafter referred to as "handle column") extending rearwardly and upwardly from the machine body and a cassette gas canister detachably attached to the handle column, and in which an operating handle is collapsably attached to the handle column. One example of such working machines is disclosed in Japanese Patent Application Laid-Open Publication No. HEI-11-170876 (JP 11-170876 A).

In the gas-engine-mounted working machine disclosed in JP 11-170876 A, the gas engine can be driven by fuel gas supplied from the cassette gas canister. By the operating handle being collapsed (i.e., retracted into a collapsed position) as necessary, the disclosed gas-engine-mounted working machine can be stored into a relatively small storage space.

The gas-engine-mounted working machine disclosed in JP 11-170876 A is constructed to allow the operating handle to be retracted into the collapsed position with the cassette gas canister kept attached to the handle column. Therefore, when the gas-engine-mounted working machine is to be stored into a storage space with the operating handle retracted to the collapsed position, it might be inadvertently stored without the cassette gas canister being detached from the handle column. There has also been known a gas-engine-mounted working machine constructed in such a manner that it can be loaded into a trunk of a vehicle or the like for transportation with the operating handle retracted to a collapsed position. Such a gas-engine-mounted working machine too might be inadvertently loaded into a trunk of a vehicle or the like without the cassette gas canister being detached from the handle column.

SUMMARY OF THE INVENTION

In view of the foregoing prior art problems, it is an object of the present invention to provide an improved gas-engine-mounted working machine which reliably reminds a human operator to detach the cassette gas canister from the handle column when the machine is to be stored into a storage space or loaded into a trunk of a vehicle or the like for transportation with the operating handle retracted to the collapsed position, so that the cassette gas canister can be reliably detached from the handle column prior to desired storage or loading with the operating handle in the collapsed position.

In order to accomplish the above-mentioned object, the present invention provides an improved gas-engine-mounted working machine, which comprises: a gas engine mounted on a machine body and supplied with fuel gas from a cassette gas canister; a handle column extending rearwardly and upwardly from the machine body, the cassette gas canister being detachably attached to the handle column; an operating handle collapsably attached to the handle column; and a collapsing-movement-preventing member provided on the operating handle for preventing collapsing movement of the operating handle, utilizing presence of the cassette gas canister attached to the handle column. Thus, the collapsing movement of the operating handle is prevented as long as the cassette gas canister is attached to the handle column. As a result, when the gas-engine-mounted working machine is to be stored into a storage space or loaded into a trunk of a vehicle or the like for transportation with the operating handle in the collapsed position, a human operator is reliably reminded to detach the cassette gas canister from the handle column; therefore, the cassette gas canister can be reliably detached from the handle column prior to desired storage or loading with the operating handle in the collapsed position.

Preferably, the collapsing-movement-preventing member is a member that projects from the operating handle so as to abut against the cassette gas canister, attached to the handle column, when the operating handle has been collapsed partway. Thus, with the simple construction of the collapsing-movement-preventing member merely projecting from the operating handle and by use of the presence of the cassette gas canister attached to the handle column, the present invention can reliably remind the human operator or the like to detach the cassette gas canister from the handle column when collapsing the operating handle. On the other hand, when the human operator attempts to attach the cassette gas canister to the handle column, the collapsing-movement-preventing member abuts against the cassette gas canister, to thereby prevent the attachment of the cassette gas canister.

Preferably, the collapsing-movement-preventing member is constructed so as to function also as a member for retaining the operating handle in a predetermined use position, by means of a locking screw inserted through a portion of the collapsing-movement-preventing member and a portion of the handle unit. Thus, there is no need for providing a separate component or member for retaining the operating handle in the use position, which can simplify the construction of the machine.

Preferably, the gas-engine-mounted working machine further comprises a gas canister cover unit for covering a substantial lower half portion of the cassette gas canister attached to the handle column, the gas canister cover unit being located forwardly of the collapsing-movement-preventing member and at generally a same height as the collapsing-movement-preventing member. The collapsing-movement-preventing member is constructed such that, (1) when the substantial lower half portion of the cassette gas canister is covered with the gas canister cover unit, a substantial upper half portion of the cassette gas canister is located forwardly and upwardly of the collapsing-movement-preventing member, (2) when the operating handle is to be collapsed forwardly with the cassette gas canister detached from the handle column (i.e., with no cassette gas canister attached to the handle column), the collapsing-movement-preventing member permits collapsing movement of the operating handle to a predetermined collapsed position, and (3) when the operating handle is to be collapsed forwardly with the cassette gas canister attached to the handle column, the collapsing-movement-preventing member abuts against the attached cassette gas canister to thereby prevent the collapsing movement of the operating handle. Such arrangements can reliably remind the human operator or the like to detach the cassette gas canister from the handle column when collapsing the operating handle. On the other hand, when the human operator attempts to attach the cassette gas canister to the handle column, the collapsing-movement-preventing member abuts against the cassette gas canister, to thereby prevent the attachment of the cassette gas canister.

Preferably, the operating handle is formed in a generally U overall shape by including: an intermediate, horizontal handle section pivotably mounted to an upper end portion of the handle column; and left and right handle sections extending rearwardly and upwardly from left and right ends, respectively, of the intermediate, horizontal handle section. Here, the collapsing-movement-preventing member is provided on the intermediate, horizontal handle section of the operating handle, because of which the collapsing-movement-preventing member can be located near the upper end portion of the liftable column. As a result, the collapsing-movement-preventing member can be formed in a compact size and simple shape.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

In the following description, the terms "front", "rear", "left" and "right" are used to refer to directions as viewed from a human operator. Whereas a walk-behind cultivating machine will hereinafter be described as a preferred embodiment of a gas-engine-mounted working machine of the present invention, the present invention is not limited to such a walk-behind cultivating machine.

Figure 1:
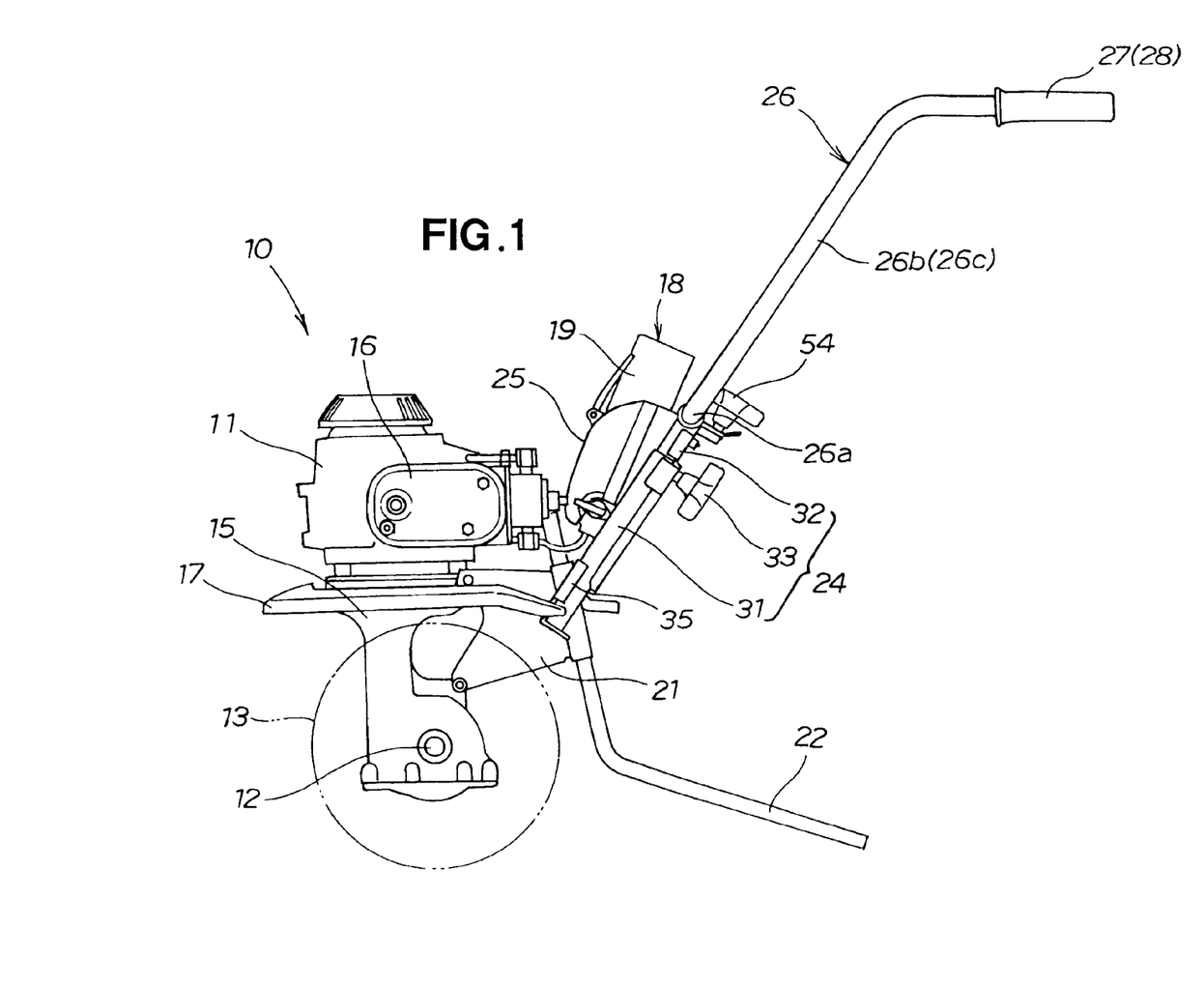
FIG. 1 is a side view showing an embodiment of a gas-engine-mounted working machine of the present invention.

FIG. 1 is a side view according to an embodiment of the gas-engine-mounted working machine 10 of the present invention. The gas-engine-mounted working machine 10 illustrated here is a walk-behind cultivating machine where driving power of a gas engine 11 is transmitted to a cultivating shaft 12 to rotate the cultivating shaft 12 so that it can travel while cultivating the soil by means of a plurality of cultivating claws 13.

The gas-engine-mounted working machine 10 includes a gas engine 11 mounted on an upper end portion of a machine body 15, a fender 17 disposed beneath the gas engine 11 and muffler 16 disposed to the left of the gas engine 11, and the plurality of cultivating claws 13 disposed beneath the fender 17.

The cultivating shaft 12 is a rotation shaft extending horizontally in a width direction of the machine body. The fender 17 is a cover for preventing dispersion of the soil. The gas engine 11 is driven by fuel gas supplied from a later-described cassette gas canister 18.

In the instant embodiment, the cassette gas canister 18 is a commercially-available gas canister where the liquid fuel gas, preferably liquefied butane consisting primarily of butane, is filled in its container 19.

The gas-engine-mounted working machine 10 further includes a support bracket 21 fixed to the machine body 15, a resistance bar 22 fixed to the support bracket 21, a handle column 24 extending rearwardly and upwardly from the support bracket 21, a gas canister retainer assembly (gas canister retainer means) 25 fixed to the handle column 24, the gas canister 18 mounted to the gas canister retainer assembly 25, and an operating handle 26 mounted to an upper end portion of the handle column 24. The resistance bar 22 is a member for adjusting a soil cultivating depth of the plurality of cultivating claws 13.

Figure 2:
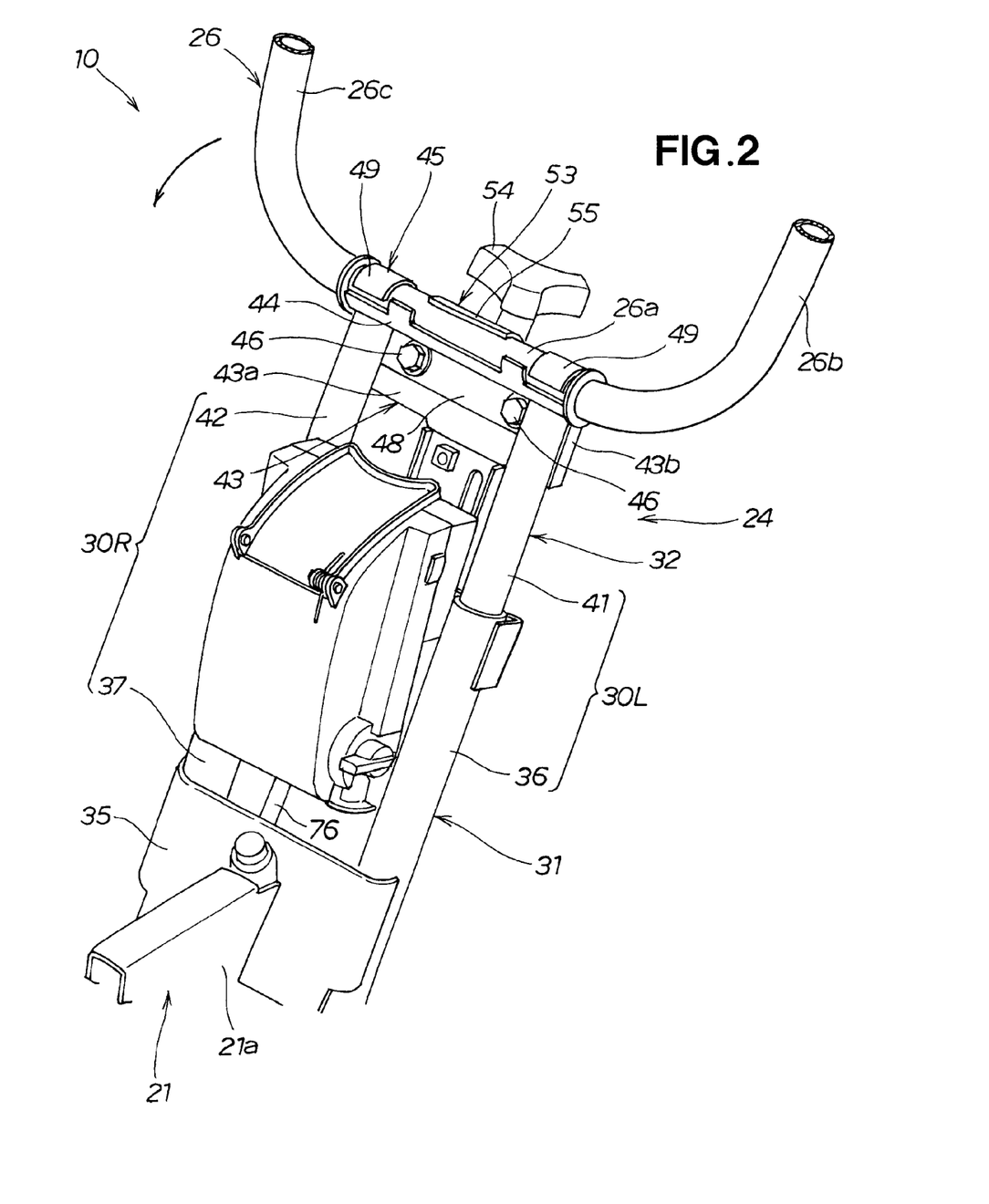
FIG. 2 is a perspective view of the gas-engine-mounted working machine with a cassette gas canister detached from a handle column.

The operating handle 26 is a cylindrical member that has a substantially U overall shape as viewed from the front (see FIG. 2). The operating handle 26 has an intermediate, horizontal handle section 26a pivotably mounted to the upper end portion of the handle column 24, left and right handle sections 26b and 26c extending rearwardly and upwardly from the left and right ends, respectively, of the intermediate, horizontal handle section 26a, and left and right grips 27 and 28 provided on respective distal end portions of the left and right handle sections 26b and 26c.

Figure 3:
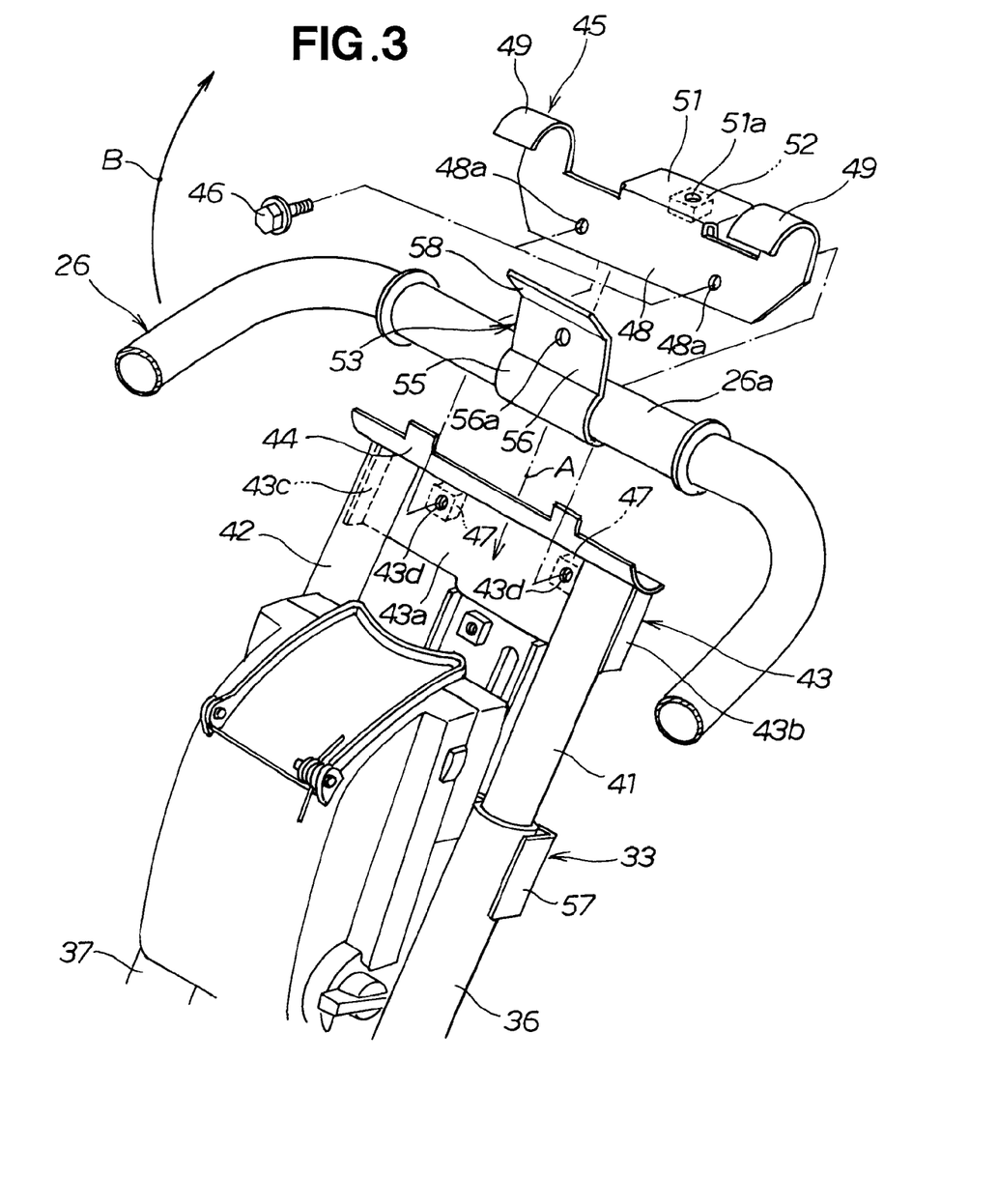
FIG. 3 is an exploded perspective view of the gas-engine-mounted working machine shown in FIG. 2.

FIG. 2 is a perspective view of the gas-engine-mounted working machine 10 with the cassette gas canister 18 detached from the handle column 24. FIG. 3 is an exploded perspective view of the gas-engine-mounted working machine 10 shown in FIG. 2.

More specifically, FIGS. 2 and 3 show the operating handle 26 held at its uppermost position with a liftable (i.e., vertically expandable/contractable) column 32 of the handle column 24 expanded upward.

The handle column 24 further includes a fixed column 31 fixed to a rear end portion 21a of the support bracket 21 and having the liftable column 32 vertically movably mounted thereto, and a retainer 33 (FIG. 5) for retaining the liftable column 32 at a desired position. The retainer 33 will be later described in detail with reference to FIG. 5.

The fixed column 31 includes a column retaining bracket 35 (see also FIG. 1) fixed to the rear end portion 21a of the support bracket 21, and left and right fixed post sections 36 and 37 fixed to left and right end portions of the column retaining bracket 35.

The left and right fixed post sections 36 and 37 are spaced from each other by a predetermined distance and have their respective lower end portions welded to the column retaining bracket 35. The left and right fixed post sections 36 and 37, each of which is in the form of a cylindrical pipe member, are disposed in left-right symmetric relation to each other with respect to the column retaining bracket 35, and the liftable column 32 is inserted in the left and right fixed post sections 36 and 37 in such a manner that it is vertically movable along the fixed post sections 36 and 37.

More specifically, the liftable column 32 has left and right liftable post sections 41 and 42 vertically movably inserted in (i.e. telescopically mounted to) the left and right fixed post sections 36 and 37, respectively, an liftable post connecting section 43 interconnecting respective upper end portions of the left and right liftable post sections 41 and 42, a handle support section 44 fixed to and spanning between the respective upper ends of the left and right liftable post sections 41 and 42, and a handle retaining member 45 that retains the operating handle 26 supported on the handle support section 44.

The left fixed post section 36 and left liftable post section 41 together constitute a left handle post 30L, while the right fixed post section 37 and right liftable post section 42 together constitute a right handle post 30R. The left and right liftable post sections 41 and 42, each of which is in the form of a cylindrical pipe member, are disposed in left-right symmetric relation to each other.

As shown in FIG. 3, the liftable post connecting section 43 has a rear flat vertical plate section 43a and left and right bent portions 43b and 43c bent forward from the left and right ends, respectively, of the rear flat vertical plate section 43a. Namely, the liftable post connecting section 43 has a generally U or channel shape defined by the rear flat vertical plate section 43a and left and right bent portions 43b and 43c.

The left bent portion 43b is welded to an upper end portion of the left liftable post section 41 while the right bent portion 43c is welded to an upper end portion of the right liftable post section 42 so that the rear flat vertical plate section 43a is spaced a predetermined distance from the left and right liftable post sections 41 and 42.

Further, the rear flat vertical plate section 43a has left and right mounting holes 43d formed in its left and right end portions, respectively, and left and right nuts 47 are disposed coaxially with the respective mounting holes 43d and welded to the rear surface of the plate section 43a.

The handle support section 44 is formed in an arcuately curved shape as viewed sideways, so that the intermediate, horizontal handle section 26a of the operating handle 26 is placed on the handle support section 44 of the arcuately curved shape and retained by the handle retaining member 45 from above.

As shown in FIG. 3, the handle retaining member 45 has an inserting plate section 48, and left and right arcuately curved retaining sections 49 are formed on left and right upper end portions of the inserting plate section 48. Locking plate section 51 is formed between the left and right arcuately curved retaining portions 49. The inserting plate section 48 has left and right mounting holes 48a formed in its left and right end portions.

The inserting plate section 48 is inserted between the left and right liftable post sections 41 and 42 and the rear flat vertical plate section 43a, as indicated by arrow A. Left and right bolts 46 are inserted through the left and right mounting holes 48a of the inserting plate section 48 and left and right mounting holes 43d of the rear flat vertical plate section 43a to be screwed to left and right nuts 47, respectively.

Thus, the handle retaining member 45 is fixed to the liftable post connecting section 43 by means of the bolts 46 and nuts 47. In this manner, the intermediate, horizontal handle section 26a of the operating handle 26, placed on the handle support section 44, is supported by the left and right arcuately curved retaining sections 49 from above. Namely, the intermediate, horizontal handle section 26a of the operating handle 26 is pivotably supported by the handle support section 44 and handle retaining member 45 (left and right arcuately curved retaining sections 49).

As shown in FIG. 3, the locking plate section 51 of the handle retaining member 45 extends in the width direction of the machine 10 along a middle upper edge portion of the rear flat vertical plate section 43a and projects rearwardly. The locking plate section 51 is located at generally the same height as the upper end of the liftable column 32.

The locking plate section 51 has a first locking hole 51a formed therein, and a locking nut 52 is disposed coaxially with the first locking hole 51a and welded to the underside surface of the locking plate section 51.

In the operating handle 26, the intermediate, horizontal handle section 26a has a collapsing-movement-preventing member 53 fixed thereto and projecting upwardly and then obliquely forwardly as shown in FIG. 3. The collapsing-movement-preventing member 53 fixed to the intermediate, horizontal handle section 26a is located at generally the same height as the upper end of the liftable column 32.

Figure 4:
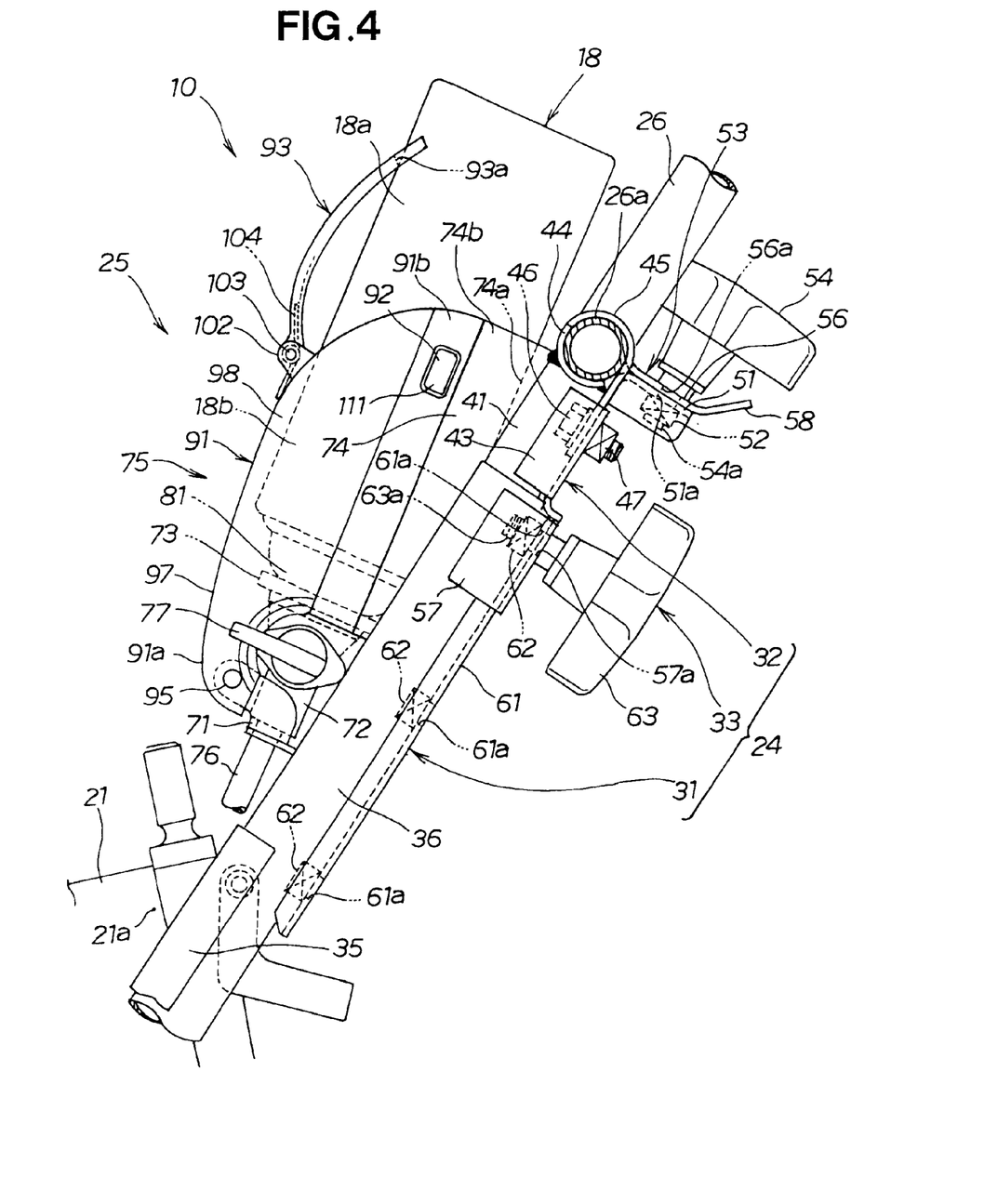
FIG. 4 is a perspective view of the gas-engine-mounted working machine, which particularly shows the cassette gas canister attached to the handle column.

The collapsing-movement-preventing member 53 is a member that can be opposed to the locking plate section 51, as shown in FIG. 4. More specifically, the collapsing-movement-preventing member 53 has an arcuately curved base portion 55 welded to a middle portion, in the width direction of the machine, to the intermediate, horizontal handle section 26a, a flat projecting portion 56 extending upward from the arcuately curved base portion 55, and a bent portion 58 bent obliquely forward from the upper end of the flat projecting portion 56. The flat projecting portion 56 has a second locking hole 56a.

As will be later detailed, the collapsing-movement-preventing member 53 is a member projecting from the intermediate, horizontal handle section 26a in such a manner that it abuts against the cassette gas canister 18 when the operating handle 26 has been collapsed partway.

After the intermediate, horizontal handle section 26a of the operating handle 26 is pivotably supported by the handle support section 44 and handle retaining member 45 during assemblage, as shown in FIG. 3, the operating handle 26 is angularly moved about the intermediate, horizontal handle section 26a as indicated by arrow B so that the flat projecting portion 56 of the collapsing-movement-preventing member 53 is superposed on the locking plate section 51 (see FIG. 4).

As shown in FIG. 4, a locking screw 54 is inserted through the second locking hole 56a of the flat projecting portion 56 and first locking hole 51a of the locking plate section 51. Threaded portion 54a of the locking screw 54, projecting downwardly out of the first locking hole 51a, is screwed to the locking nut 52, so that the operating handle 26 is retained in its predetermined use position as shown in FIG. 2.

Thus, the collapsing-movement-preventing member 53 can function also as a member for retaining the operating handle 26 in the use position. Therefore, there is no need for providing a separate component or member for retaining the operating handle 26 in the use position.

Further, the operating handle 26 can be collapsed forwardly by the threaded portion 54a of the locking screw 54 being moved out of threaded engagement with the locking nut 52. Namely, the operating handle 26 is collapsably attached to the handle column 24 via the retainer assembly 25. The collapsing of the operating handle 26 and collapsing-movement-preventing member 53 will be later described in detail with reference to FIGS. 7-9.

FIG. 4 is a perspective view showing the cassette gas canister 18 attached to the handle post 24 of the gas-engine-mounted working machine 10. In FIG. 4, the operating handle 26 is retained in its lowermost position with the liftable column 32 held in its lowermost position. The liftable column 32 is retained at a predetermined height position by the retainer 33.

The retainer 33 has a fixed post connecting section 57 interconnecting respective upper end portions of the left and right fixed post sections 36 and 37 (see FIG. 5), a first retaining hole 57a formed in a substantial middle region of the fixed post connecting section 57, a slide plate 61 extending downward from the liftable post connecting section 43, and a plurality of second retaining holes 61a formed in the slide plate 61 at predetermined vertical intervals. A plurality of retaining nuts 62 are disposed coaxially with the respective second retaining holes 61a and welded to the underside surface of the slide plate 61. As an example, the second retaining holes 61a are formed in three positions, e.g. upper, middle and lower positions, of the slide plate 61.

By the liftable column 32 being retained at its lowermost position, the operating handle 26 is retained at its lowermost position with the second retaining hole 61a, formed in the upper position of the slide plate 61, is aligned coaxially with the first retaining hole 57a of the retainer 33.

Retaining screw 63 is inserted through the coaxially-aligned first retaining hole 57a and second retaining hole 61a, and a threaded portion 63a of the retaining screw 63, projecting out of from the second retaining hole 61a, is screwed to the retaining nut 62, so that the liftable column 32 (and hence the operating handle 26) is retained at the lowermost position.

By the liftable column 32 being raised to its middle position, the second retaining hole 61a, formed in the middle position of the slide plate 61, is aligned coaxially with the first retaining hole 57a of the retainer 33. Thus, the liftable column 32 (and hence the operating handle 26) is retained at its middle position higher than the lowermost position by means of the retaining screw 63 and retaining nut 62.

Further, by the liftable column 32 being raised to its uppermost position, the second retaining hole 61a, formed in the lower position of the slide plate 61, is aligned coaxially with the first retaining hole 57a of the retainer 33. Thus, the liftable column 32 (and hence the operating handle 26) is retained at its uppermost position by means of the retaining screw 63 and retaining nut 62.

The gas canister retainer assembly 25 is fixed to the handle column 24. The gas canister retainer assembly 25 includes an adaptor bracket 71 disposed between the left and right fixed post sections 36 and 37 shown in FIG. 5, an opening/closing valve 72 provided on the adaptor bracket 71, an adaptor unit 73 connected to the opening/closing valve 72, a gas canister holder 74 disposed above the adaptor unit 73, and a gas canister cover unit 75 openably and closably mounted to the adaptor bracket 71.

The opening/closing valve 72 has a supply port (not shown) formed in its lower portion communicating with a fuel passage 76 for leading liquid fuel gas, and a switching knob 77 is attached to a left side portion of the valve 72.

The adaptor unit 73 is a member to which a nozzle-side end portion 81 of the cassette gas canister 18 is to be operatively connected or attached, and the adaptor unit 73 is disposed in a substantial middle region between the left and right fixed post sections 36 and 37.

The gas canister holder 74 is disposed between the left and right fixed post sections 36 and 37 and has an arcuately-curved recessed portion 74a facing, and corresponding in shape to, a rear wall portion of the cassette gas canister 18, so that the rear wall portion of the cassette gas canister 18 is supported by the arcuately-curved recessed portion 74a. The gas canister holder 74 has its upper end located at generally the same height of the upper end of the column 32.

Figure 5:
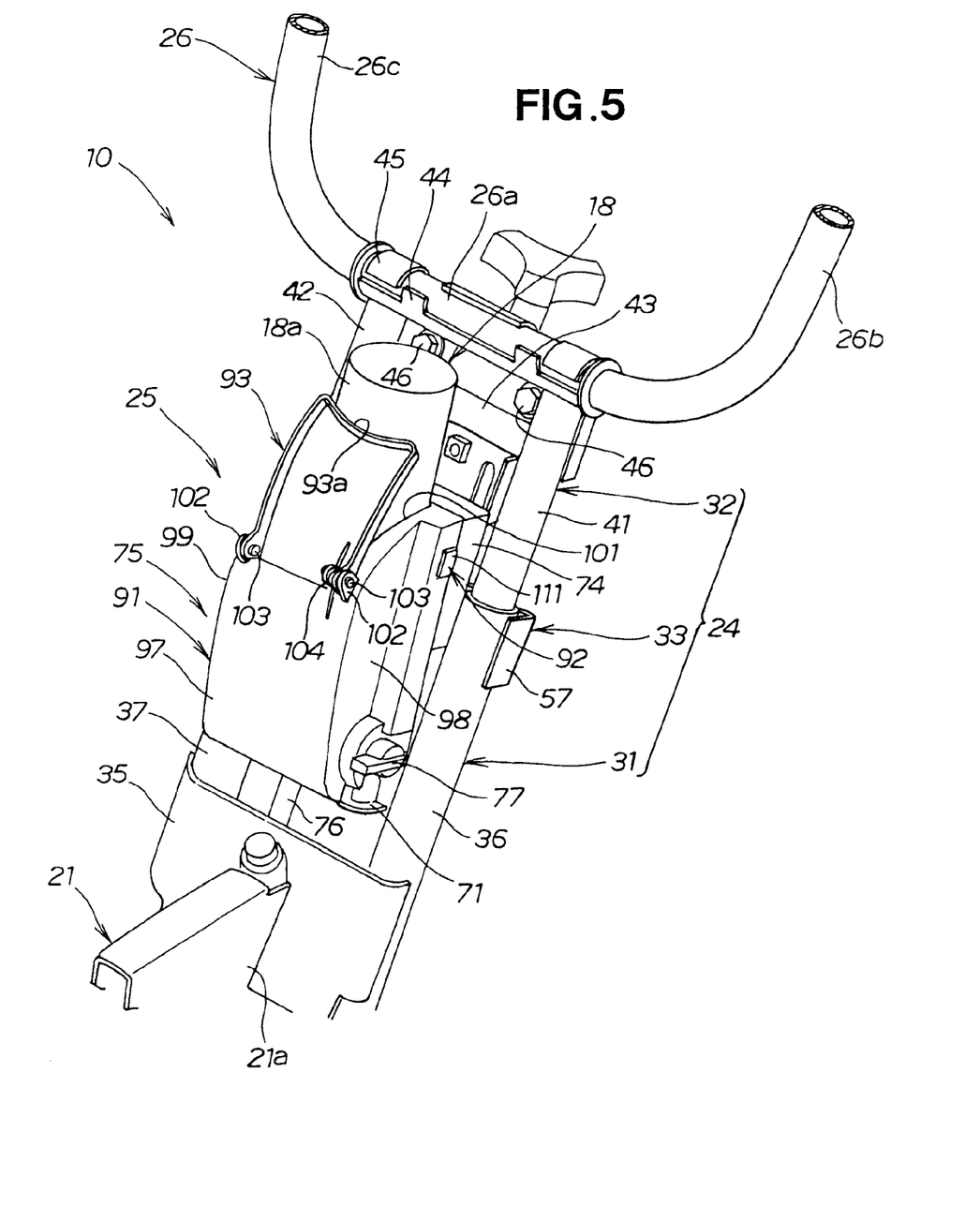
FIG. 5 is a perspective view corresponding to FIG. 4.

FIG. 5 is a perspective view corresponding to FIG. 4, which shows the operating handle 26 retained at its uppermost position with the column 32 lifted upward.

The gas canister cover unit 75 is disposed between and extends along the left and right handle posts 30L and 30R, so as to not only cover a substantial lower half portion 18b (see FIG. 4) of the cassette gas canister 18 but also support the cassette gas canister 18.

The gas canister cover unit 75 includes a main cover member 91 openably and closably supported on the adaptor bracket 71, a lock mechanism 92 for locking the main cover member 91 in a closed position, a sub cover member 93 openably and closably supported on an upper end portion of the main cover member 91.

The cassette gas canister 18 supported by the gas canister cover unit 75 is located substantially centrally between the left and right handle posts 30L and 30R. Thus, the cassette gas canister 18 can be effectively protected by the left and right handle posts 30L and 30R and left and right handle sections 26b and 26c.

Thus, even if only the substantial lower half portion 18b of the cassette gas canister 18 is covered with the gas canister cover unit 75 as noted above, the substantial upper half portion 18a can be protected sufficiently by the left and right handle posts 30L and 30R and left and right handle sections 26b and 26c.

More specifically, when the liftable column 32 of the handle column 24 is in the upwardly expanded or lifted position, the substantial upper half portion 18a of the cassette gas canister 18 can be protected by the left and right handle posts 30L and 30R, as shown in FIG. 5. When the liftable column 32 of the handle column 24 is in the contracted or lowered position, on the other hand, the substantial upper half portion 18a of the cassette gas canister 18 can be protected by the left and right handle sections 26b and 26c, as shown in FIG. 5.

The main cover member 91 is disposed in a position opposed to the gas canister holder 74 (see also FIG. 4), and it is pivotably supported at a lower end section 91a thereof by the adaptor bracket 71 by means of left and right support pins 95. The main cover member 91 has a front wall section 97 and left and right side wall sections 98 and 99. the main cover member 91 has its upper end 91b located at generally the same height of the upper end of the column 32.

As shown in FIG. 4, the front wall section 97 has a lower half portion of a substantially flat plate shape, a bent portion bent rearward from the lower end of the lower half portion, and an upper half portion curved rearward from the upper end of the lower half portion.

Opening portion 101 is formed in the upper half portion of the front wall section 97, and left and right supporting protrusions 102, projecting laterally outward, are formed on the upper half portion near the opening portion 101. The opening portion 101 is formed to allow a substantial upper half portion 18a of the cassette gas canister 18 to project upward.

The sub cover member 93 is pivotably supported by the left and right supporting protrusions 102 via left and right support pins 103. The sub cover member 93 is normally biased or urged, by means of coil springs 104 mounted on the left and right support pins 103, in a direction to close the opening portion 101 of the front wall section 97.

The sub cover member 93 has an upper end portion 93a arcuately curved so as to contact the substantial upper half portion 18a of the cassette gas canister 18 over a considerably wide area. Thus, the entire upper end portion 93a can pressingly hold the cassette gas canister 18 by use of the biasing force of the coil springs 104. In this way, it is possible to effectively prevent vibrations of the cassette gas canister 18 that may occur during operation of the gas-engine-mounted working machine 10.

The substantial upper half portion 18a of the cassette gas canister 18 projects upward beyond the upper end 91b of the main cover 91 and is located at a higher position than the liftable column 32.

Thus, the substantial upper half portion 18a of the cassette gas canister 18 is located forwardly and upwardly of the collapsing-movement-preventing member 53. Thus, as the operating handle 26 is angularly moved or pivoted forward about the intermediate, horizontal handle section 26a, the collapsing-movement-preventing member 53 can interfere with, or abut against, the substantial upper half portion 18a of the cassette gas canister 18. Therefore, with the cassette gas canister 18 attached to the retainer assembly 25 of the machine 10, the collapsing-movement-preventing member 53 can prevent collapsing movement of the operating handle 26.

With the cassette gas canister 18 detached from the machine 10, on the other hand, the sub cover 93 abuts against the upper end 91b of the main cover 91 through the biasing force of the coil springs 104. In this state, the sub cover 93 is located at generally the same height as the upper end of the liftable column 32.

Namely, with the cassette gas canister 18 detached from the retainer assembly 25 of the machine 10, the gas canister cover unit 75 is disposed forwardly of the collapsing-movement-preventing member 53 and at generally the same height as the collapsing-movement-preventing member 53. Therefore, the instant embodiment can prevent the collapsing-movement-preventing member 53 from interfering with the gas canister cover unit 75 as the operating handle 26 is pivoted forward about the intermediate, horizontal handle section 26a. Thus, with the cassette gas canister 18 detached from the retainer assembly 25 of the machine 10, the instant embodiment permits desired collapsing movement of the operating handle 26.

Figure 6:
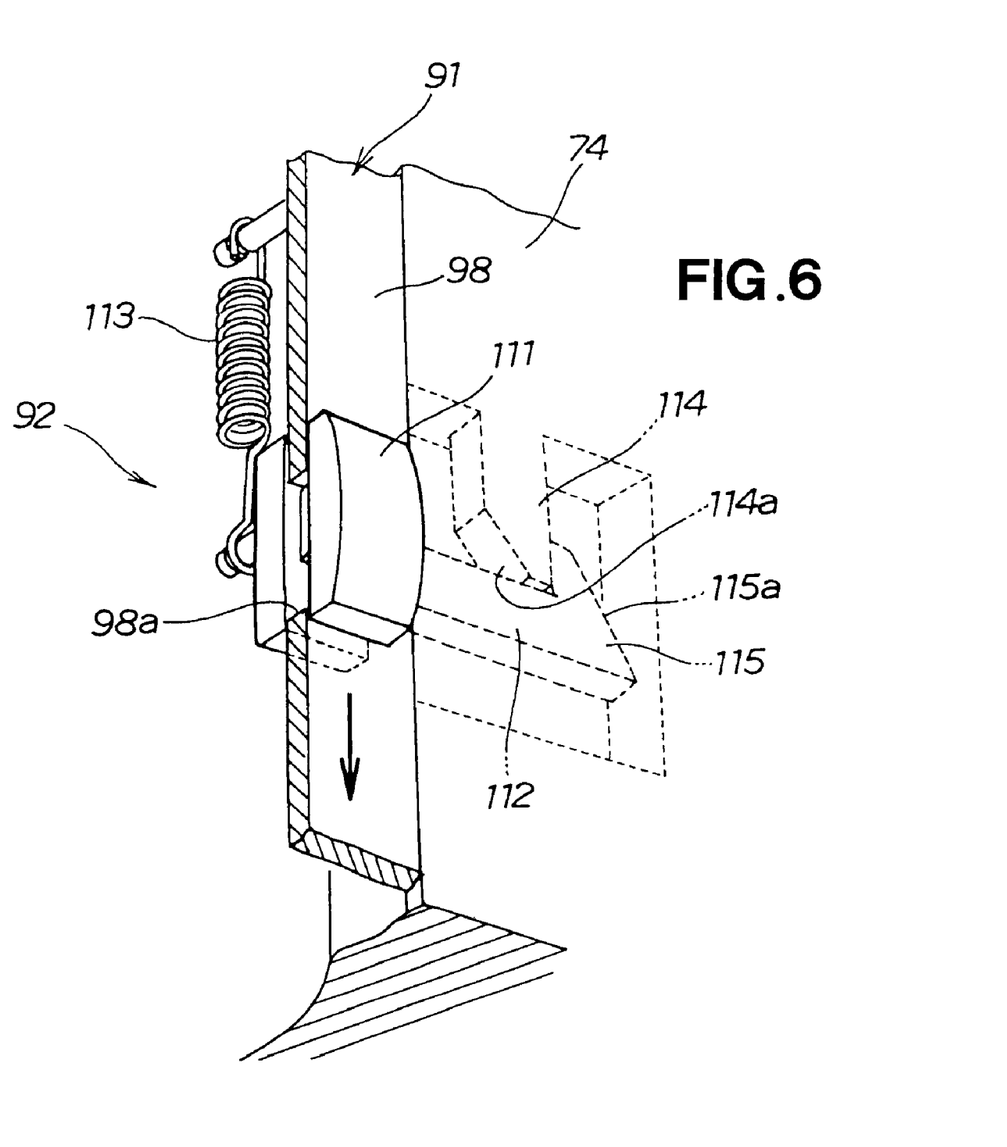
FIG. 6 is a perspective view of a lock mechanism of a gas canister cover unit in the gas-engine-mounted working machine.

FIG. 6 is a perspective view of the lock mechanism 92 of the gas canister cover unit 75. The lock mechanism 92 includes a slide knob 111 slidably mounted in a slide opening 98a of the left wall portion 98, an engaging lever 112 extending rearward from the slide knob 111, a tension spring 113 for retaining the slide knob 111 in an engaging position, and an engaging block 114 provided on the gas canister holder 74.

By retaining the slide knob 111 in the locking position by the biasing force of the tension spring 113, an engaging claw 115 of the engaging lever 112 is kept engaging with the engaging block 114. Thus, the lock mechanism 92 is kept in its locking position so that the main cover member 91 can be kept closed.

As the slide knob 111 is moved downward as indicated by an arrow against the biasing force of the tension spring 113 in the aforementioned condition, the engaging claw 115 is disengaged from the engaging block 114. Thus, the locking state of the lock mechanism 92 is canceled, so that the main cover member 91 can be opened.

When closing the main cover member 91 from the opened position, a slanting surface 115a of the engaging claw 115 first abuts against a slanting surface 114a of the engaging block 114, so that the engaging claw 115 is pressed in an arrowed direction by the slanting surface 114a of the engaging block 114. Thus, the engaging lever 112 moves in the arrowed direction against the biasing force of the tension spring 113.

Then, as the main cover 91 reaches its closed position, the engaging claw 115 gets over the slanting surface 114a of the engaging block 114. Thus, the engaging lever 112 moves back to a locking position by the biasing force of the tension spring 113, so that the engaging claw 115 of the engaging lever 112 is kept in engagement with the engaging block 114.

In the aforementioned manner, the lock mechanism 92 can be retained in the locking position to thereby retain the main cover member 91 in the closed position.

Note that, by closing the main cover 91 in the aforementioned manner, the opening portion 101 (see FIG. 4) of the main cover member 91 can be abutted against a container 19 of the cassette gas canister 18.

Figure 7A:
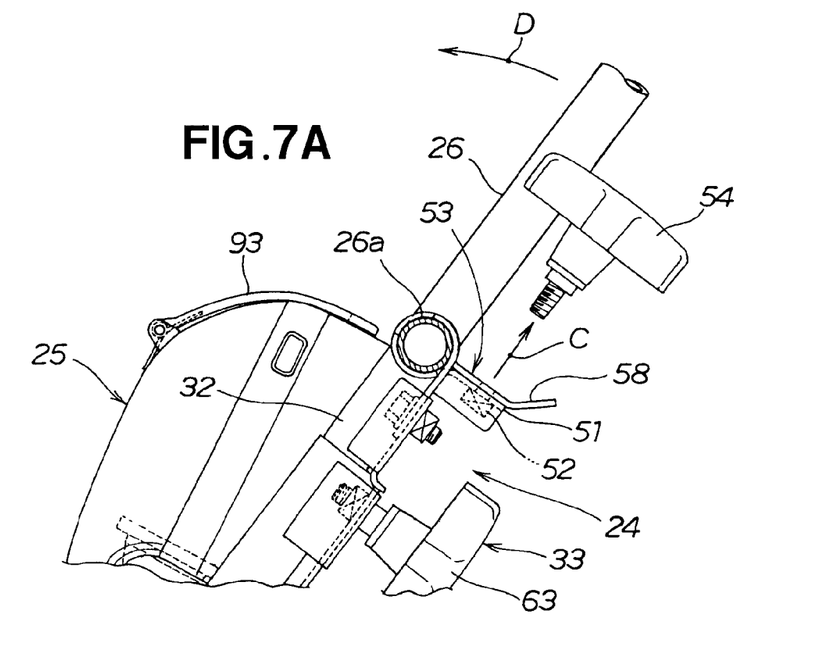
FIGS. 7A-7B are views explanatory of how an operating handle is collapsed forwardly.

Next, with reference to FIGS. 7-8, a description will be given about an example manner in which the operating handle 26 is collapsed, i.e. retracted to the collapsed position. FIGS. 7A-7B are views explanatory of how the operating handle 26 is collapsed forwardly. As shown in FIG. 7A, the cassette gas canister 18 is detached from the gas canister retainer assembly 25, and the liftable column 32 of the handle column 24 is lowered to and retained at the lowermost position. The operating handle 26 is retained in its lowermost position with the liftable column 32 retained in its lowermost position.

With the operating handle 26 thus retained in its lowermost position, the locking screw 54 is loosened out of engagement with the locking nut 52 as indicated by arrow C. After the disengagement of the locking screw 54 from the locking nut 52, the operating handle 26 is pivoted about the intermediate, horizontal handle section 26a in a counterclockwise direction as indicated by arrow D in FIG. 7A.

Figure 7B:
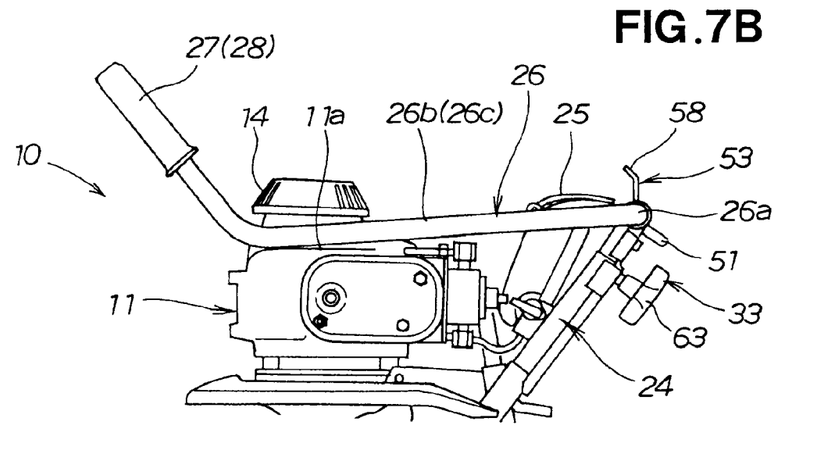

As the operating handle 26 is pivoted about the intermediate, horizontal handle section 26a in the counterclockwise direction, the bent portion 58 of the collapsing-movement-preventing member 53 pivots toward the gas canister retainer assembly 25, as shown in FIG. 7B.

Then, the cassette gas canister 18 is detached from the gas canister retainer assembly 25, because of which, even if the bent portion 58 pivots toward the gas canister retainer assembly 25, it is not stopped by the cassette gas canister 18. In this way, the operating handle 26 can be pivoted until the left and right handle sections 26b and 26c are placed on upper surface portions 11a of the gas engine 11 which are located to the left and right of a fan cover 14.

Figure 8A:
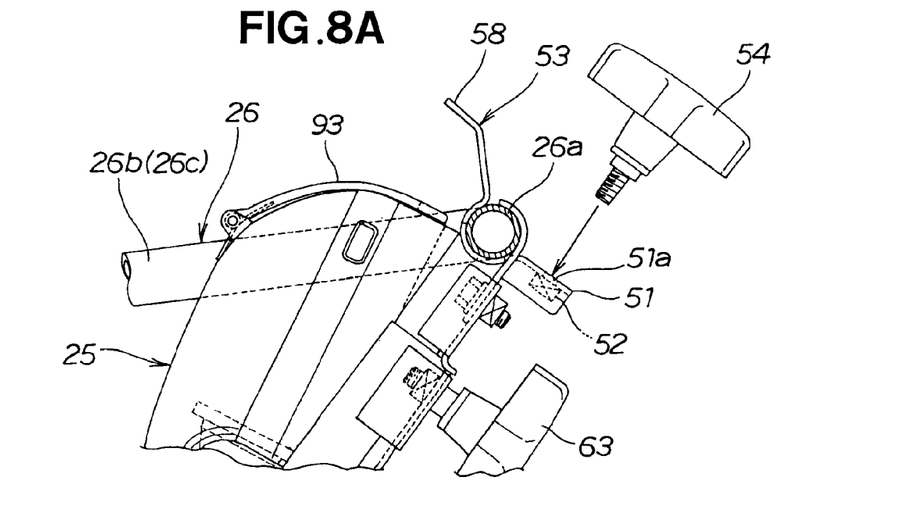
FIGS. 8A and 8B are views showing the operating handle having been collapsed forwardly.
Figure 8B:
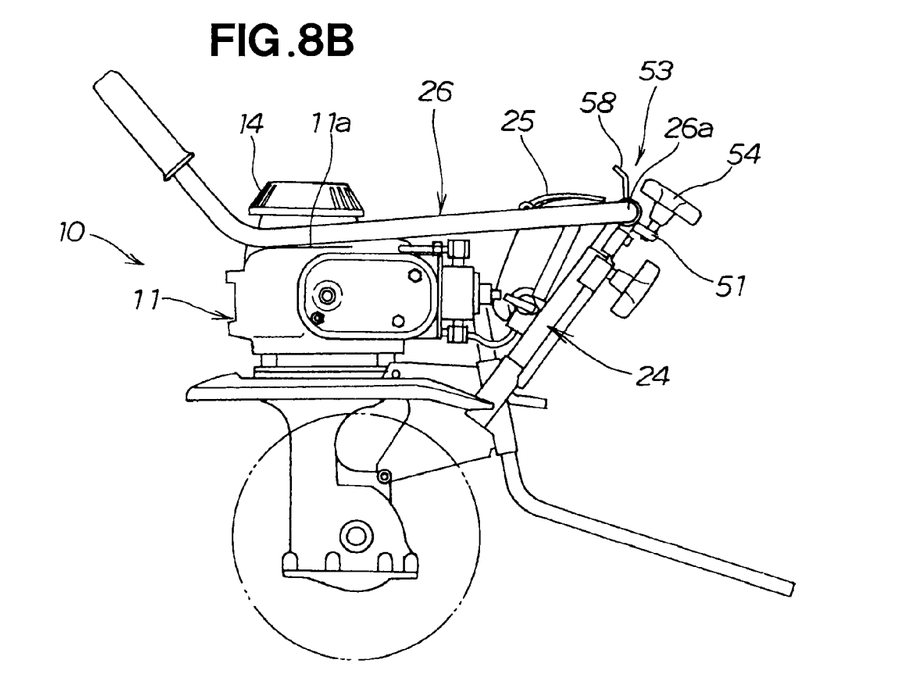

FIGS. 8A and 8B are views showing the operating handle 26 of the working machine 10 having been collapsed forwardly. As shown in FIG. 8A, the locking screw 54 is inserted through the first locking hole 51a of the locking plate section 51 and screwed to the locking nut 52. Because the locking screw 54 can be firmly secured to the locking plate section 51 in this manner, it is possible to reliably prevent the locking screw 54 from being lost.

By the collapsing of the operating handle 26, as seen FIG. 8B, the gas-engine-mounted working machine 10 can be stored into a relatively small storage space, or loaded into a trunk of a vehicle or the like for transportation via the vehicle. Also, by collapsing the operating handle 26 further downward, the gas-engine-mounted working machine 10 can be made even more compact in size.

When the human operator or someone else attempts to attach the cassette gas canister 18 with the operating handle 26 retracted in the collapsed position, the gas canister 18 would abut against the bent portion 58 of the collapsing-movement-preventing member 53 so that the attachment of the cassette gas canister 18 when the operating handle 26 is in the collapsed position can be prevented.

Next, with reference to FIG. 9, a description will be given about an example manner in which the collapsing movement of the operating handle 26 is prevented utilizing the presence of the cassette gas canister 18 attached to the handle column 24. FIGS. 9A and 9B are views explanatory of how the collapsing-movement-preventing member 53 prevents the collapsing of the operating handle 26.

Figure 9A:
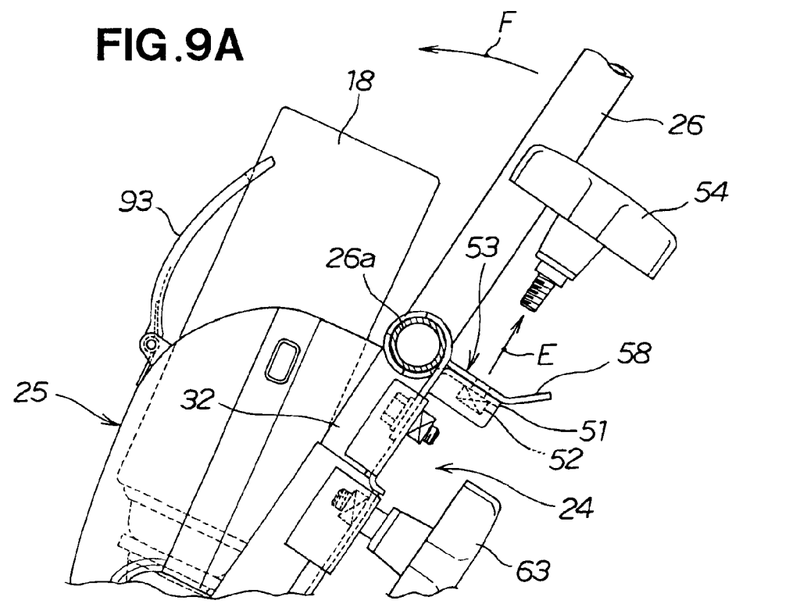
FIGS. 9A and 9B are views explanatory of how a collapsing-movement-preventing member prevents collapsing movement of the operating handle.

In FIG. 9A, the cassette gas canister 18 is shown as kept attached to the gas canister retainer assembly 25. In this condition, the liftable column 32 of the handle column 24 is lowered to and retained at the lowermost position, so that the operating handle 26 is retained at the lowermost position.

With the operating handle 26 retained at the lowermost position, the locking screw 54 is loosened out of engagement with the locking nut 52 as indicated by arrow E. After the disengagement of the locking screw 54 from the nut 52, the operating handle 26 is pivoted about the intermediate, horizontal handle section 26a in the counterclockwise direction as indicated by arrow F in FIG. 9A. The locking screw 54 may be any other suitable locking fastener.

Figure 9B:
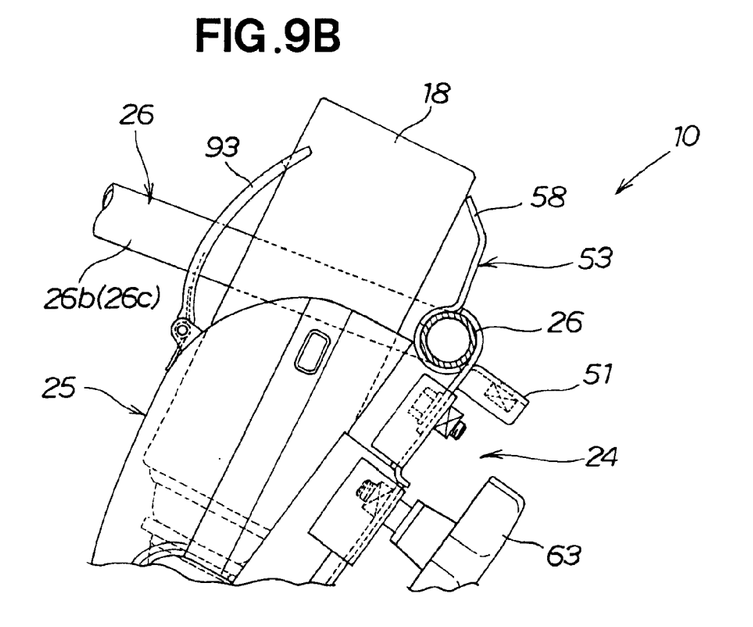

As the operating handle 26 is pivoted about the intermediate, horizontal handle section 26a in the counterclockwise direction, the bent portion 58 of the collapsing-movement-preventing member 53 pivots toward the cassette gas canister 18, as shown in FIG. 9B. Thus, when the bent portion 58 has pivoted toward the retainer assembly 25 to some degree, the bent portion 58 comes to interfere with, or abut against, the cassette gas canister 18.

Namely, the operating handle 26 can not be pivotally retracted to the predetermined collapsed position because the bent portion 58 abuts against the cassette gas canister 18 during the time when the left and right handle sections 26b and 26c are angularly moved toward the upper surface portions 11a of the gas engine 11 located to the left and right of the fan cover 14. Therefore, the operating handle 26 is prevented from pivoting to the predetermined collapsed position.

In the instant embodiment of the gas-engine-mounted working machine 10, as described above, the cassette gas canister 18 is attached to the handle column 24 via the retainer assembly 25, and the collapsing-movement-preventing member 53 is provided for preventing the collapsing of the operating handle 26 utilizing the presence of the attached cassette gas canister 18. Thus, as long as the cassette gas canister 18 is attached to the handle column 24 via the retainer assembly 25, the operating handle 26 can be reliably prevented by the collapsing-movement-preventing member 53 from being retracted into the collapsed position. Namely, unless the cassette gas canister 18 is detached from the handle column 24, it can not be retracted into the collapsed position.

In the aforementioned manner, when the gas-engine-mounted working machine 10 is to be stored into a storage space or loaded into a trunk of a vehicle or the like for transportation with the operating handle 26 retracted in the collapsed position, the instant embodiment reliably reminds the human operator or the like to detach the cassette gas canister 18 from the handle column 24 prior to the desired storage or loading, so that the cassette gas canister from the handle column can be reliably detached from the handle column prior to the desired storage or loading with the operating handle in the collapsed position.

Further, in the above-described embodiment, the collapsing-movement-preventing member 53 projects from the operating handle 26, and the collapsing-movement-preventing member 53 (more specifically, bent portion 58) abuts against the cassette gas canister 18 when the operating handle 26 has been collapsed partway. Thus, with the simple construction of the collapsing-movement-preventing member 53 merely projecting from the operating handle 26 and by use of the presence of the cassette gas canister 18 attached to the handle column 24, the instant embodiment reliably reminds the human operator or the like to detach the cassette gas canister 18 from the handle column 24 when collapsing the operating handle 26.

In addition, in the above-described embodiment, the operating handle 26 has a generally U overall shape as shown in FIG. 2, the intermediate, horizontal handle section 26a is pivotably mounted to the upper end portion of the liftable column 32, and the collapsing-movement-preventing member 53 is provided on the intermediate, horizontal handle section 26a. Thus, the collapsing-movement-preventing member 53 can be located near the upper end portion of the liftable column 32, so that the collapsing-movement-preventing member 53 can be formed in a compact size and simple shape as shown in FIG. 3.

Whereas the preferred embodiment has been described in relation to the case where the collapsing-movement-preventing member 53 has the bent portion 58, the present invention is not so limited; for example, the collapsing-movement-preventing member 53 may be formed in any other suitable shape, such as a shape having no such bent portion 58. In the case where the collapsing-movement-preventing member 53 does not have the bent portion 58, the projecting amount of the projecting portion 56 may be adjusted as necessary to allow the collapsing-movement-preventing member 53 to abut against the cassette gas canister 18 during the collapsing movement of the handle 26 with the gas canister 18 kept attached to the handle column 24.

Further, whereas the preferred embodiment has been described in relation to the case where the collapsing-movement-preventing member 53 is constructed to function also as the member for retaining the operating handle 26 in the use position, the present invention is not so limited; for example, there may be provided a separate member for retaining the operating handle 26 in the use position.

Furthermore, whereas the preferred embodiment has been described in relation to the case where the collapsing-movement-preventing member 53 is provided on the intermediate, horizontal handle section 26a of the operating handle 26, the present invention is not so limited; for example, the collapsing-movement-preventing member 53 may be provided on either or both of the left and right handle sections 26b and 26c of the operating handle 26.

The present invention is well suited for application to gas-engine-mounted working machines including a handle column extending rearwardly and upwardly from the machine body and an operating handle collapsably attached to the handle column.

Obviously, various minor changes and modifications of the present invention are possible in light of the above teaching. It is therefore to be understood that within the scope of the appended claims the invention may be practiced otherwise than as specifically described.

What is claimed is:

1. A gas-engine-mounted working machine comprising:
   a gas engine mounted on a machine body and supplied with fuel gas from a cassette gas canister;
   a handle column extending rearwardly and upwardly from the machine body, the cassette gas canister being detachably attached to said handle column;
   an operating handle collapsably attached to said handle column; and
   a collapsing-movement-preventing member provided on said operating handle for preventing collapsing movement of said operating handle, utilizing presence of the cassette gas canister attached to said handle column, so that the collapsing movement of said operating handle is prevented as long as the cassette gas canister is attached to said handle column.

2. The gas-engine-mounted working machine of claim 1, wherein said collapsing-movement-preventing member is a member that projects from said operating handle so as to abut against the cassette gas canister, attached to said handle column, when said operating handle has been collapsed partway.

3. The gas-engine-mounted working machine of claim 1, wherein said collapsing-movement-preventing member is constructed so as to function also as a member for retaining said operating handle in a predetermined use position, by means of a locking fastener inserted through a portion of said collapsing-movement-preventing member and a portion of said handle unit.

4. The gas-engine-mounted working machine of claim 1, further comprising a gas canister cover unit for covering a substantial lower half portion of the cassette gas canister attached to said handle column, said gas canister cover unit being located forwardly of said collapsing-movement-preventing member and at generally a same height as said collapsing-movement-preventing member, and wherein said collapsing-movement-preventing member is constructed such that, when the substantial lower half portion of the cassette gas canister is covered with said gas canister cover unit, a substantial upper half portion of the cassette gas canister is located forwardly and upwardly of said collapsing-movement-preventing member, when said operating handle is to be collapsed forwardly with the cassette gas canister detached from said handle column, said collapsing-movement-preventing member permits collapsing movement of the operating handle to a predetermined collapsed position, and when said operating handle is to be collapsed forwardly with the cassette gas canister attached to said handle column, said collapsing-movement-preventing member abuts against the attached cassette gas canister to thereby prevent the collapsing movement of said operating handle.

5. The gas-engine-mounted working machine of claim 1, wherein said operating handle is formed in a generally U overall shape by including: an intermediate, horizontal handle section pivotably mounted to an upper end portion of said handle column; and left and right handle sections extending rearwardly and upwardly from left and right ends, respectively, of the intermediate, horizontal handle section, and wherein said collapsing-movement-preventing member is provided on the intermediate, horizontal handle section of said operating handle.

* * * * *